US012577883B2

(12) United States Patent
K.P. et al.

(10) Patent No.: US 12,577,883 B2
(45) **Date of Patent: *Mar. 17, 2026**

(54) BLADE TIP CLEARANCE CONTROL USING MATERIAL WITH NEGATIVE THERMAL EXPANSION COEFFICIENTS

(71) Applicant: General Electric Company, Cincinnati, OH (US)

(72) Inventors: Naveena K.P., Bengaluru (IN); Ravindra Shankar Ganiger, Bengaluru (IN); Kishore Budumuru, Bengaluru (IN); Kudum Shinde, Bengaluru (IN)

(73) Assignee: General Electric Company, Evendale, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/761,008

(22) Filed: Jul. 1, 2024

(65) Prior Publication Data

US 2024/0352865 A1 Oct. 24, 2024

Related U.S. Application Data

(63) Continuation of application No. 18/092,751, filed on Jan. 3, 2023, now Pat. No. 12,025,011.

(30) Foreign Application Priority Data

Nov. 17, 2022 (IN) ............................ 202211065931

(51) Int. Cl.
*F01D 11/18* (2006.01)
*F01D 11/12* (2006.01)
(Continued)

(52) U.S. Cl.
CPC ............ *F01D 11/18* (2013.01); *F01D 11/122* (2013.01); *F01D 11/08* (2013.01); *F01D 11/20* (2013.01);
(Continued)

(58) Field of Classification Search
CPC .... F01D 11/08; F01D 11/20–22; F01D 11/24; F01D 11/122; F01D 25/005;
(Continued)

(56) References Cited

U.S. PATENT DOCUMENTS 4,525,998 A 7/1985 Schwarz
8,152,457 B2 * 4/2012 Flanagan ............... F01D 11/24 415/173.1
(Continued)

OTHER PUBLICATIONS

United States Patent and Trademark Office, "Non-Final Office Action," issued in connection with U.S. Appl. No. 18/092,751, mailed on Jun. 9, 2023, 18 pages.

*Primary Examiner* — Nathaniel E Wiehe
*Assistant Examiner* — Art Golik
(74) *Attorney, Agent, or Firm* — Hanley, Flight & Zimmerman, LLC

(57) ABSTRACT

Clearance control systems with thermal actuators are disclosed. An example thermally-actuated clearance control system for a gas turbine engine includes a compliant material; a high-conductive material coupled to a first surface of the compliant material, the high-conductive material thermally coupling the compliant material to a heated substance, the compliant material to expand radially-inward toward a fan blade when the high-conductive material provides heat; and an abradable material coupled to a second surface of the compliant material facing the fan blade.

15 Claims, 11 Drawing Sheets

(51) Int. Cl.

| | |
|---|---|
| *F01D 11/08* | (2006.01) |
| *F01D 11/20* | (2006.01) |
| *F01D 11/22* | (2006.01) |
| *F01D 11/24* | (2006.01) |
| *F01D 25/00* | (2006.01) |

(52) U.S. Cl.
CPC .............. *F01D 11/22* (2013.01); *F01D 11/24* (2013.01); *F01D 25/005* (2013.01); *F05D 2240/11* (2013.01); *F05D 2300/502* (2013.01); *F05D 2300/5021* (2013.01); *F05D 2300/5024* (2013.01); *F05D 2300/603* (2013.01)

(58) Field of Classification Search
CPC ................. F01D 11/18; F05D 2240/11; F05D 2300/502; F05D 2300/5021; F05D 2300/5024; F05D 2300/603–6034
See application file for complete search history.

(56) References Cited

U.S. PATENT DOCUMENTS

| | | | | |
|---|---|---|---|---|
| 9,845,731 | B2 | 12/2017 | Birnkrant et al. | |
| 9,926,801 | B2 | 3/2018 | Uskert et al. | |
| 10,066,630 | B2 * | 9/2018 | Kumar | F02C 3/04 |
| 10,815,816 | B2 * | 10/2020 | Kray | F02C 9/18 |
| 10,851,712 | B2 | 12/2020 | Van der Merwe et al. | |
| 11,255,214 | B2 * | 2/2022 | Prasad | F02C 9/18 |
| 2002/0001519 | A1 * | 1/2002 | Webster | F01D 11/22 415/173.2 |
| 2012/0156007 | A1 * | 6/2012 | Bacic | F01D 11/20 415/126 |
| 2015/0118036 | A1 * | 4/2015 | Ohtani | F01D 25/24 415/200 |
| 2017/0175769 | A1 | 6/2017 | Sun et al. | |
| 2018/0209292 | A1 | 7/2018 | Hiernaux | |
| 2019/0345836 | A1 | 11/2019 | Terwilliger et al. | |
| 2021/0317749 | A1 | 10/2021 | Dibenedetto et al. | |

* cited by examiner

BLADE TIP CLEARANCE CONTROL USING MATERIAL WITH NEGATIVE THERMAL EXPANSION COEFFICIENTS

RELATED APPLICATIONS

This patent claims the benefit of U.S. patent application Ser. No. 18/092,751, which was filed on Jan. 3, 2023, which claims priority to Indian Provisional Patent Application No. 202211065931, which was filed on Nov. 17, 2022. U.S. patent application Ser. No. 18/092,751 and Indian Provisional Patent Application No. 202211065931 are hereby incorporated herein by reference in their entirety.

FIELD OF THE DISCLOSURE

This disclosure relates generally to gas turbine engines, and more specifically, to clearance control for fan blade and/or blade tips in a gas turbine.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section.

In particular configurations, the compressor section includes, in serial flow order, a high pressure (HP) compressor and a low pressure (LP) compressor. Similarly, the turbine section includes, in serial flow order, a high pressure (HP) turbine and a low pressure (LP) turbine. The HP compressor, LP compressor, HP turbine, and LP turbine include a one or more axially spaced apart rows of circumferentially spaced apart rotor blades. Each rotor blade includes a rotor blade tip. One or more shrouds may be positioned radially outward from and circumferentially enclose the rotor blades.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1:
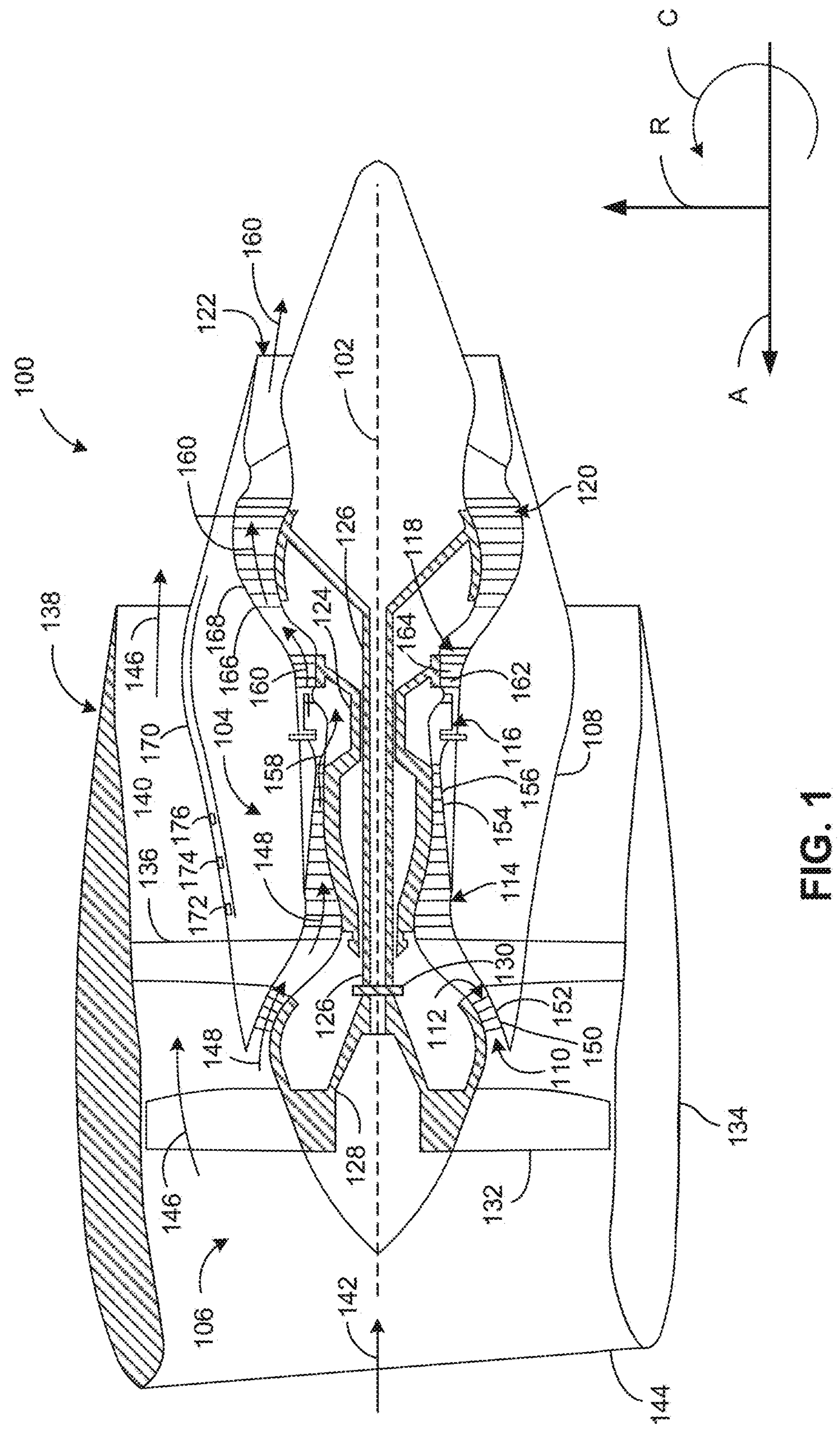
FIG. 1 illustrates a cross-sectional view of a gas turbine engine.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, joined, detached, decoupled, disconnected, separated, etc.) are to be construed broadly and may include intermediate members between a collection of elements and relative movement between elements unless otherwise indicated. As used herein, the term "decouplable" refers to the capability of two parts to be attached, connected, and/or otherwise joined and then be detached, disconnected, and/or otherwise non-destructively separated from each other (e.g., by removing one or more fasteners, removing a connecting part, etc.). As such, connection/disconnection references do not necessarily infer that two elements are directly connected and in fixed relation to each other. Stating that any part is in "contact" with another part means that there is no intermediate part between the two parts.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Known clearance control systems for fan blades within gas turbine engines include materials that provide a physical deflection response when a load is applied (e.g., when a blade comes into contact with a casing, shroud, etc.). Additional known clearance control systems for fan blades within gas turbine engines further include mechanisms for electromagnetic actuation of a shroud that is configured to move radially inward and/or outward in response to ambient conditions. Example clearance control systems disclosed herein utilize thermal actuation methods to heat and/or cool a compliant material to cause an expansion and/or contraction of a shroud based to a measured clearance width between the fan blade and the casing, shroud, etc. In some examples, the thermally-actuated clearance control system is configured to narrow a clearance (e.g., a clearance between the fan blade and fan casing) when aircraft cruise conditions cause the fan blade to contract away from the fan casing, preventing engine performance and/or efficiency loss resulting from a large gap between the fan blade and the fan casing (e.g., which allows for heat, etc. to escape from the engine). Examples disclosed herein may additionally include proximity sensor(s) to actively monitor fan blade expansion and/or retraction, relative to the fan casing, to drive the thermally-actuated clearance control system response.

Additionally, example thermally-actuated clearance control systems disclosed herein include a layer of compliant material within an example shroud, as explained further hereinbelow in conjunction with FIG. 3. In examples disclosed herein, the term "compliant material" is used to describe a particular type and/or category of composite material characterized by a negative coefficient of thermal expansion. In examples disclosed herein, composite materials with a negative coefficient of thermal expansion are observed to require a higher threshold of activation for deflection, which proves useful in high-temperature environments, such as those within a gas turbine engines, for example. That is, for thermal actuation methods, unwanted radial deflection and/or change of the example shroud would be counterproductive to the directed movement desired to mitigate engine efficiency and/or performance loss. Therefore, compliant materials are utilized within such thermal actuation mechanisms, as further described hereinbelow.

Various terms are used herein to describe the orientation of features. As used herein, the orientation of features, forces and moments are described with reference to the yaw axis, pitch axis, and roll axis of the vehicle associated with the features, forces, and moments. In general, the attached figures are annotated with reference to the axial direction, radial direction, and circumferential direction of the gas turbine associated with the features, forces, and moments. In general, the attached figures are annotated with a set of axes including the roll axis R, the pitch axis P, and the yaw axis Y. As used herein, the terms "longitudinal," and "axial" are used interchangeably to refer to directions parallel to the roll axis. As used herein, the term "lateral" is used to refer to directions parallel to the pitch axis. As used herein, the term "vertical" and "normal" are used interchangeably to refer to directions parallel to the yaw axis.

In some examples used herein, the term "substantially" is used to describe a relationship between two parts that are within three degrees of the stated relationship (e.g., a substantially colinear relationship is within three degrees of being linear, a substantially perpendicular relationship is within three degrees of being perpendicular, a substantially parallel relationship is within three degrees of being parallel, etc.). "Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Many gas turbine engine architectures include fan casings circumferentially enclosing the rotor blades of the engine. The proximity of the rotor blades to the casing results in frequent physical contact between the blades and casing, particularly when flight and/or ambient conditions cause the fan blades to expand and come into contact with the casing, causing eventual blade tip loss. Additionally, when ambient conditions cause the fan blades to retract (e.g., radially inward), a large gap is observed between the fan blade and casing, from which heat and/or energy accordingly may escape, causing a reduction in overall engine efficiency.

Examples disclosed herein are intended to overcome the above-referenced deficiencies via use of thermal energy directed towards a compliant material, which accordingly expands to close a gap (e.g., clearance) between the fan blade and casing, in response to activation as a result of a measured clearance width, to act as a clearance control system (referred to herein as a thermally-actuated clearance control system). The thermally-actuated clearance control system, in examples disclosed herein, allows for a narrowing and/or widening of the clearance between the blades and casing, in response to an expansion and/or reduction of the fan blades based on flight conditions (e.g., the expansion and/or reduction monitored by proximity sensors). The importance of this clearance control system is observed, for example, to mitigate engine performance and/or efficiency loss as a result of a wide clearance between the fan blade and casing. The compliant material, in conjunction with abradable material(s), conductive material(s), and/or proximity sensor(s), allows for the dynamic mitigation of engine performance loss as flight conditions change, and acts an active clearance control system.

Referring now to the drawings, wherein identical numerals indicate the same elements throughout the figures, FIG. 1 is a schematic cross-sectional view of a turbofan-type gas turbine engine 100 ("turbofan 100"). As shown in FIG. 1, the turbofan 100 defines a longitudinal or axial centerline axis 102 extending therethrough for reference. In general, the turbofan 100 may include a core turbine 104 or gas turbine engine disposed downstream from a fan section 106.

The core turbine 104 generally includes a substantially tubular outer casing 108 ("turbine casing 108") that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106 ("fan shaft 128"). In some examples, the LP shaft 126 may couple directly to the fan shaft 128 (i.e., a direct-drive configuration). In alternative configurations, the LP shaft 126 may couple to the fan shaft 128 via a reduction gearbox 130 (e.g., an indirect-drive or geared-drive configuration).

As shown in FIG. 1, the fan section 106 includes a plurality of fan blades 132 coupled to and extending radially outwardly from the fan shaft 128. An annular fan casing or nacelle 134 (also referred to herein as the fan case 134) circumferentially encloses the fan section 106 and/or at least a portion of the core turbine 104. The nacelle 134 is supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween. Certain flight conditions (e.g., increase in engine temperature, decrease in engine temperature, etc.) may cause the plurality of fan blades 132 to expand radially-outward from the fan shaft 128 towards the nacelle 134 or may cause the plurality of fan blades 132 to retract radially-inward towards the fan shaft 128 and away from the nacelle 134. The expansion and/or retraction of the plurality of fan blades 132 in response to changing flight conditions can result in tip loss of the plurality of fan blades 132, and/or other unwanted damage to the component, if a dynamic clearance (e.g., gap) is not maintained between the plurality of fan blades 132 and the nacelle 134. Additionally, in particular, the retraction of the plurality of fan blades 132 in response to ambient conditions can result in engine performance loss.

As illustrated in FIG. 1, air 142 enters an inlet portion 144 of the turbofan 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator vanes 162 and HP turbine rotor blades 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the turbofan 100, the core turbine 104 serves a similar purpose and sees a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106. FIG. 1 further includes a cowling 170 and offset-arch gimbals 172-176. The cowling 170 is a covering which may reduce drag and cool the engine. The offset-arch gimbals 172-176 may, for example, include infrared cameras to detect a thermal anomaly in the under-cowl area of the turbofan 100.

Figure 2:
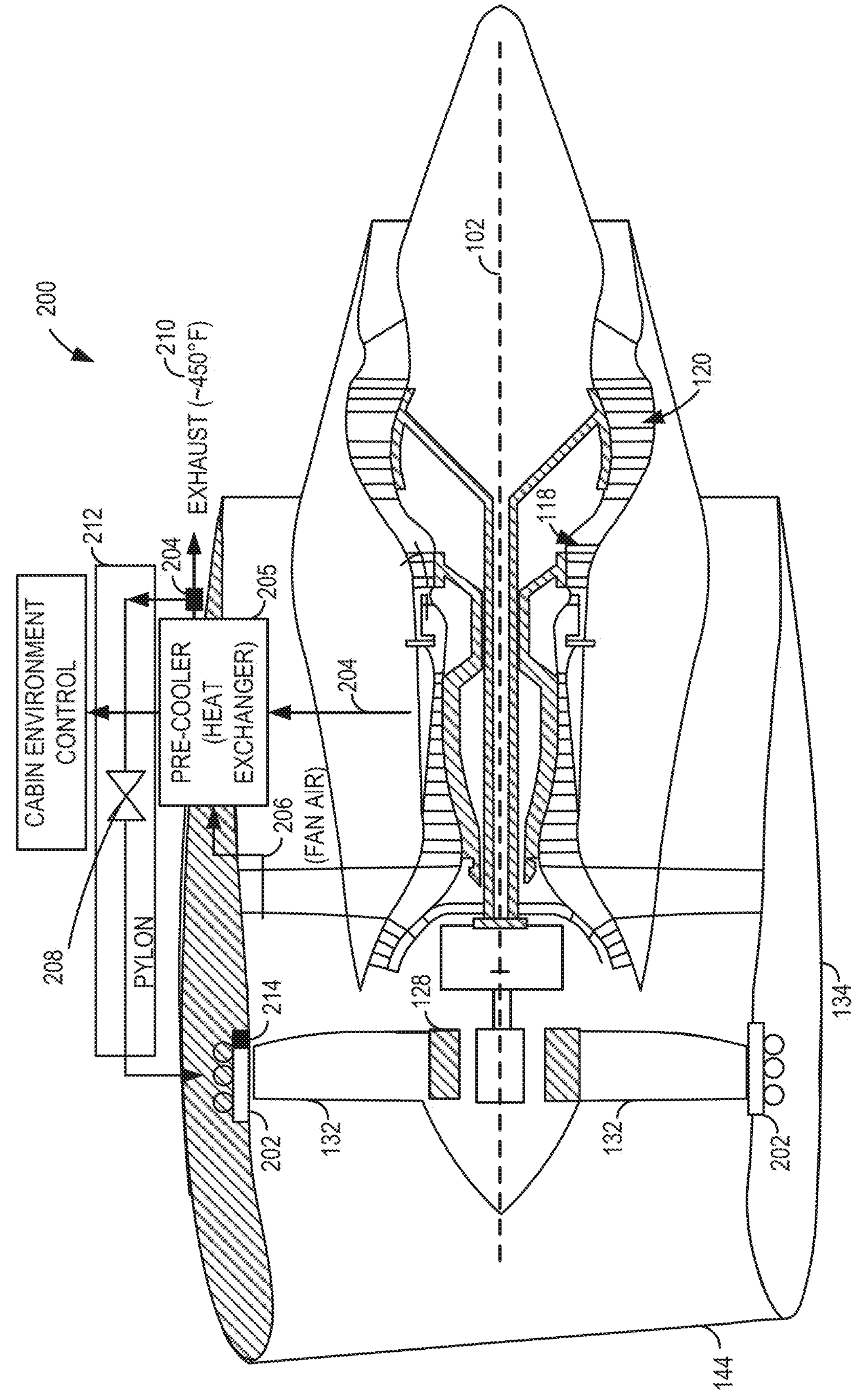
FIG. 2 depicts a cross-sectional view of an example thermally-actuated clearance control system, implemented in accordance with the teachings of this disclosure.

FIG. 2 depicts a cross-sectional view of an example thermally-actuated clearance control system 200, implemented in accordance with the teachings of this disclosure. The example thermally-actuated clearance control system 200 includes an example thermally-actuated shroud 202, example engine bleed air 204, an example pre-cooler 205, example fan air 206, an example control valve 208, example exhaust air 210, an example pylon 212, an example thermal actuation controller 214, and the example nacelle 134, the example (plurality of) fan blade(s) 132, the example fan shaft 128, the example high pressure (HP) turbine 118, and the example low pressure (LP) turbine 120 of FIG. 1.

The example engine bleed air 204 is high-pressure and high-temperature air that is routinely (e.g., continuously) exhaust from the compressor section of an engine as it runs, in all stages of aircraft use. The engine bleed air 204 is often utilized for aircraft cabin pressurization, cabin air conditioning, etc. However, in examples disclosed herein, at least a portion of the example engine bleed air 204 is routed (e.g., by the example pre-cooler 205) through the example pylon 212 towards the thermally-actuated shroud 202 when a deflection response is needed in response to an observed clearance width. In examples disclosed herein, a large portion of the engine bleed air 204 is routed towards (e.g., via a duct and/or valve) the pre-cooler 205, which is configured to cool down that portion of the hot engine bleed air 204 prior to use in the aircraft cabin (e.g., for pressurization, air conditioning, etc.).

In examples disclosed herein, however, a smaller portion of the engine bleed air 204 may be routed through the pylon 212, towards the thermally-actuated shroud 202, in response to a determination that clearance control is warranted (e.g., by the thermal actuation controller 214). In examples disclosed herein, the example control valve 208 may open and/or close to route the engine bleed air 204 accordingly. In some examples, the Full Authority Digital Engine Control (FADEC) and/or the thermal actuation controller 214 determines whether clearance control between the thermally-actuated shroud 202 and fan blade 132 is warranted (e.g., in response to a clearance width measurement obtained from a proximity sensor). However, any other type of controller and/or controlling mechanism may be utilized. When clearance control is determined to be warranted (e.g., by the thermal actuation controller 214), the control valve 208, in conjunction with the pre-cooler 205, routes the engine bleed air 204 through the pylon 212 towards the thermally-actuated shroud 202. However, when clearance control is determined to not be warranted (e.g., by the thermal actuation controller 214), the control valve 208, in conjunction with the pre-cooler 205, routes the engine bleed air 204 through the pylon 212 towards the aircraft cabin. The engine bleed air 204 routed towards the aircraft cabin, for use in air conditioning purposes, etc., is often cooled prior to routing through the pylon 212 by the example fan air 206. In examples disclosed herein, the engine bleed air 204 may be around 450 degrees Fahrenheit, and the fan air 206, which is cool air emitted by the fan blades 132 while running, accordingly lowers the temperature of the engine bleed air 204 (e.g., from 500 to 450 degrees Fahrenheit, from 450 to 400 degrees Fahrenheit, from 450 to 430 degrees Fahrenheit, etc.). In examples disclosed herein, a portion of the engine bleed air 204 that is not utilized for either clearance control of cabin pressurization, air conditioning, etc. may be channeled out through the back of the engine as exhaust air 210.

In the illustrated example of FIG. 2, hot air (e.g., engine bleed air 204) is used to heat the thermally-actuated shroud 202 and cause radially-inward contraction of the thermally-actuated shroud 202 towards the fan blade 132 (e.g., as the thermally-actuated shroud 202 expands with heat exposure). However, in other examples, hot oil and/or any other type of heating mechanism and/or heat-conductive material may be used for thermal actuation (e.g., of the thermally-actuated shroud 202).

Figure 3:
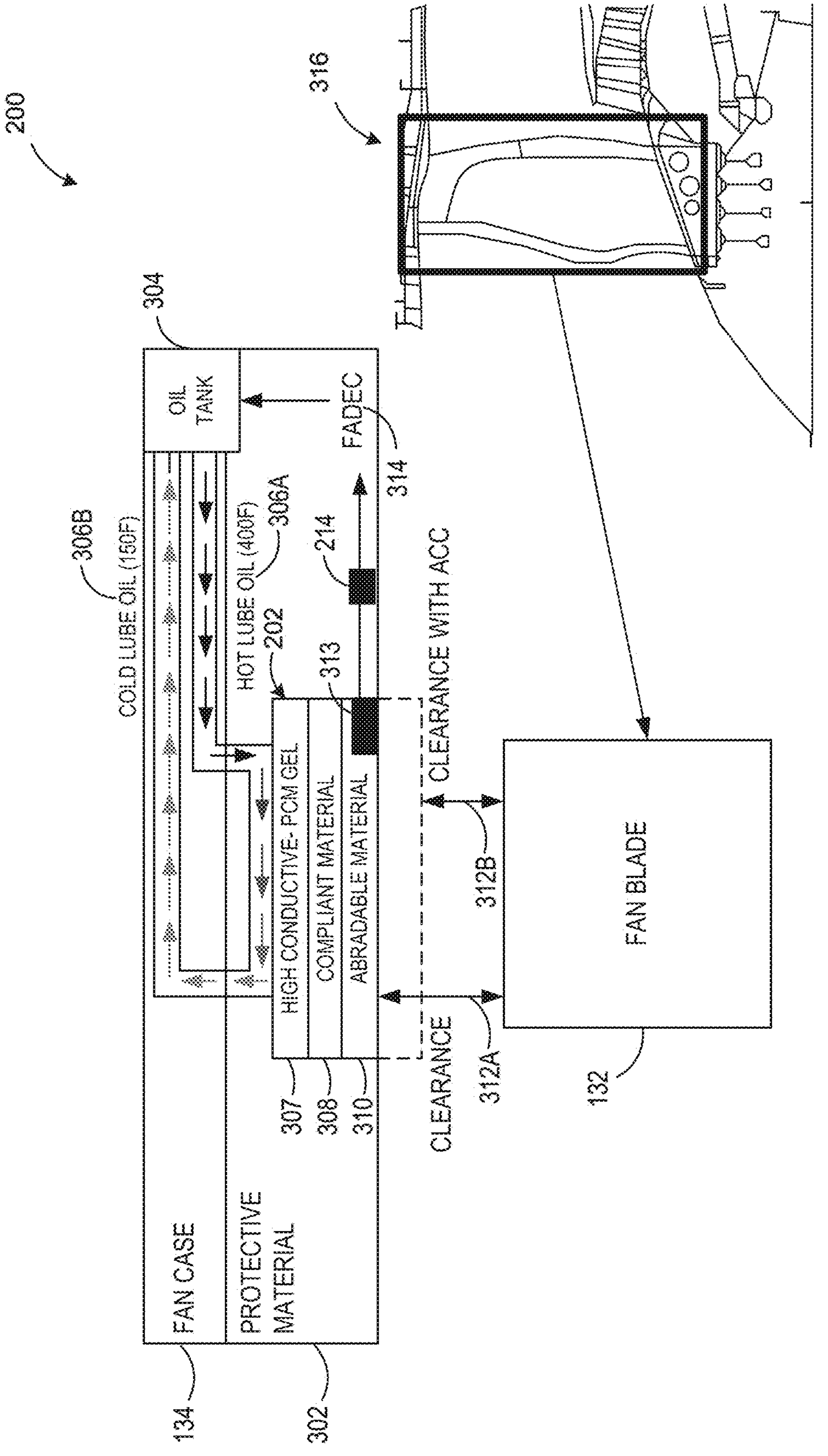
FIG. 3 illustrates a detailed view of the thermally-actuated clearance control system of FIG. 2, as positioned within an example engine.

FIG. 3 illustrates a detailed view of the thermally-actuated clearance control system 200, as positioned within an example engine 316. In the example thermally-actuated clearance control system 200 illustrated in FIG. 3, hot oil (e.g., hot lube oil 306A) is used to activate the thermally-actuated shroud 202 instead of hot air (e.g., engine bleed air 204 of FIG. 2). The example hot lube oil 306A is channeled from an oil tank 304 of the engine 316, through the fan case 134. In examples disclosed herein, the oil tank 304 of the engine may provide oil (e.g., hot lube oil 306A, cold lube oil 306B) to gears and/or other mechanical parts of the engine for lubrication. In this illustrated example of FIG. 3, the FADEC 314 (and/or the thermal actuation controller 214 of FIG. 2) determines whether clearance control is warranted to mitigate engine performance loss. The FADEC 314, in conjunction with the thermal actuation controller 214 of FIG. 2, makes this determination based on, for example, information from a proximity sensor 313, which is configured to measure a clearance (e.g., wide clearance 312A, narrow clearance 312B) between the fan blade 132 and the thermally-actuated shroud 202, which is positioned inside of the fan case 134. In some examples the thermally-actuated shroud may further be positioned within a protective material 302 (e.g., such as Kevlar), in order to further protect the fan case 134 in the event of a contact made with the fan blade 132. The protective material 302, in some examples, may include insulated channels that shield the protective material 302 from exposure to heat (e.g., greater than or equal to 400 degrees Fahrenheit). Such a protective material 302 is accordingly used in conjunction with the thermally-actuated shroud 202, which is configured to provide a radially-inward contraction response (e.g., as the thermally-actuated shroud 202 expands with heat) at very high temperatures. Similarly, in some examples disclosed herein, the thermally-actuated shroud 202 further includes a layer of high conductive material 307, a layer of compliant material 308, and a layer of abradable material 310.

The high conductive material 307 (e.g., phase change material (PCM) gel) is similarly characterized by a high temperature tolerance, as well a high conductive capacity for heat. That is, the high conductive material 307 may be characterized by not reacting (e.g., expanding and/or contracting) in response to ambient temperatures less than 400 degrees Fahrenheit, for example, and/or by having an example thermal conductivity coefficient that is greater than or equal to 0.08 Watts per meter-Kelvin (W/mK). The high conductive material 307 is positioned to protect the compliant material 308 and the abradable material 310 from direct exposure to the hot lube oil 306A (which may be upwards of 400 degrees Fahrenheit in temperature) but still provides heat conduction to actuate the compliant material 308 accordingly. As the high conductive material 307 conducts heat from the hot lube oil 306A through to the compliant material 308, the compliant material 308 then accordingly expands radially-inward, towards the fan blade 132 to close the clearance from the wide clearance 312A to the narrow clearance 312B, thus mitigating engine performance loss as a result of a large clearance width. In examples disclosed herein, the thermally-actuated shroud 202 further includes a layer of abradable material 310, which is configured to protect the compliant material 308, high conductive material 307, and fan case 134 from damage resulting from an accidental contact with the fan blade 132.

In examples disclosed herein, the compliant material 308 is a type of composite material (e.g., ALLVAR alloy, etc.) characterized by a negative coefficient of thermal expansion (CTE) (e.g., —30 parts per million per degree Celsius (ppm/° C.), etc.). In examples disclosed herein, composite materials with a negative coefficient of thermal expansion are observed to require a higher threshold temperature of activation for deflection (e.g., greater than or equal to 450 degrees Fahrenheit, etc.), which proves useful in high-temperature environments (e.g., where ambient temperatures are greater than or equal to 400 degrees Fahrenheit, etc.), such as those within a gas turbine engines, for example. That is, for thermal actuation methods, unwanted radial deflection and/or change of the example shroud would be counterproductive to the directed movement desired to mitigate engine efficiency and/or performance loss. Therefore, compliant materials are utilized within such thermal actuation mechanisms in examples disclosed herein.

In addition to being characterized by a negative coefficient of thermal expansion, the compliant material 308, in examples disclosed herein, is further characterized by having a high alpha coefficient (e.g., greater than or equal to $18*10^{-6}$ ksi per degree Fahrenheit, etc.). An alpha coefficient, in examples disclosed herein, represents a formability and/or degree of available deflection response of a given material (e.g., the larger the alpha coefficient associated with a composite material, the greater the degree of available deflection response of the composite material). That is, the compliant material 308, characterized by both a high alpha coefficient and a negative coefficient of thermal expansion is more resistant to ambient temperatures (e.g., possesses a higher threshold activation temperature) and is capable of providing a malleable deflection response in the event of contact with a blade tip during flight conditions, thus protecting the fan case from incurring damage.

For example, if the compliant material 308, having a negative coefficient of thermal expansion, further had an alpha coefficient value of $-18*10^{-6}$ ksi/F (kilopounds per square inch per degree Fahrenheit), and the compliant material 308 experienced a temperature rise (e.g., due to coming into contact with a heated substance) of 100 degrees Fahrenheit in an engine having a fan diameter of 128 inches, thermal expansion (e.g., radial deflection dR) of the compliant material 308 would be given by Equation 1 below (where $R_0$ represents a radius of the fan blade at a time 0 and $R_1$ represents the radius at a time 1, the difference corresponding to the radial deflection dR). Therefore, as shown in the particular example of Equation 2, the compliant material 308 (with certain characteristics represented by alpha (e.g., a high alpha material)), when heated by 100 degrees Fahrenheit, would move radially-inward (e.g., towards the fan blade) by 115 mils, effectively closing a gap between the fan blade and fan case.

$$dR = R_0 - R_1 = R_0 * \text{alpha} * {}^\circ\text{ F.} \quad \text{Equation 1}$$

$$dR = R_0 - R_1 = \left(\frac{128}{2}\right) * \left(-18 * 10^{-6}\right) * (100) = -0.115. \quad \text{Equation 2}$$

Additionally, in examples disclosed herein, the hot lube oil 306A, once routed across the thermally-actuated shroud 202, becomes cold lube oil 306B, due to the principles of heat transfer. The heat from the hot lube oil 306A is transferred to the high conductive material 307, which is in turn conducted to the compliant material 308, causing radially-inward expansion (e.g., by 0.1 inches, 0.2 inches, 0.115 inches, etc.), resulting in cold lube oil 306B being routed back to the oil tank 304.

Furthermore, in examples disclosed herein, the FADEC 314 may compare the clearance width reading obtained from the proximity sensor 313 against a threshold value and/or a set of threshold values in order to determine whether the hot lube oil 306A should be routed towards the thermally-actuated shroud 202 for clearance control.

Figure 4:
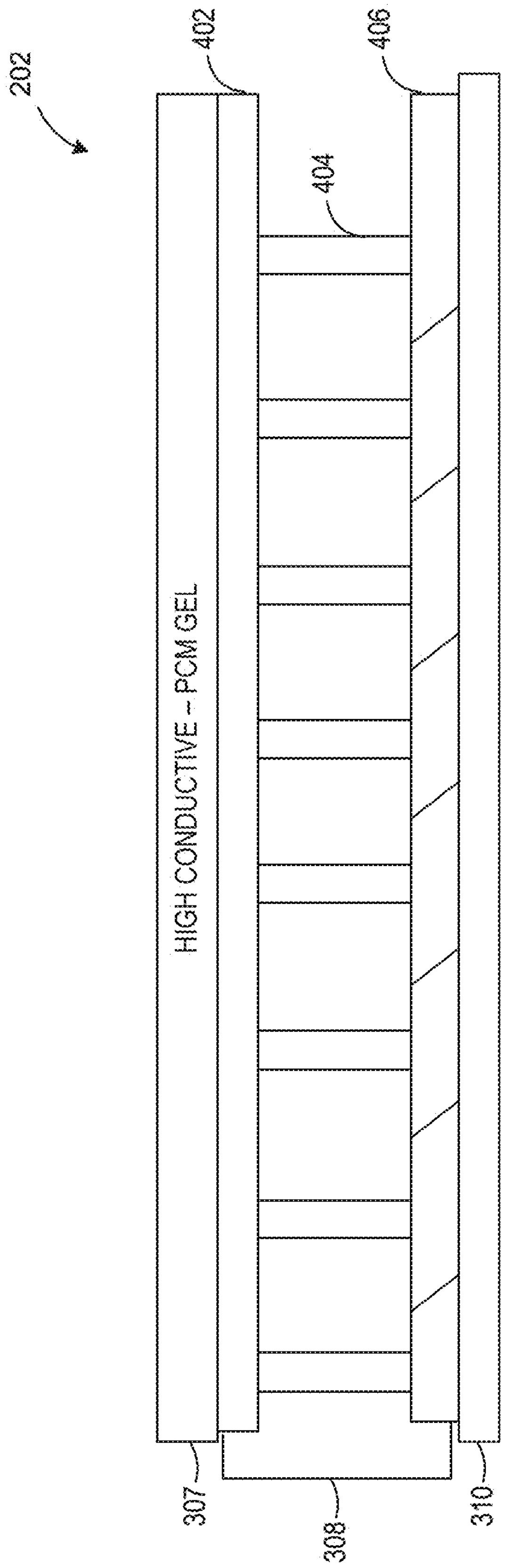
FIG. 4 depicts the example thermally-actuated shroud of the thermally-actuated clearance control system of FIGS. 2 and/or 3.

FIG. 4 depicts the example thermally-actuated shroud 202 of the thermally-actuated clearance control system 200 of FIGS. 2 and/or 3 in greater detail. As illustrated in the example of FIG. 4, the high conductive material 307 is positioned on top of the compliant material 308, and the compliant material 308 is positioned on top of the abradable material 310. As further described hereinabove in conjunction with FIG. 3, the high conductive material 307 acts as a protective barrier against hot oil, air, etc. for the compliant material 308 but still provides a high level of head conductance to thermally-activate the compliant material 308 when clearance control is required. Furthermore, in examples disclosed herein, the compliant material 308 may be further characterized by varying thickness and/or shapes in order to fit the contour of a fan blade (e.g., the fan blade 132) to best mitigate engine performance loss as a result of a large clearance width between the fan blade and fan casing (e.g., the fan case 134). The abradable material 310 is further configured to protect the compliant material 308 from any unwanted damage as a result from accidental contact with the fan blade during ambient flight conditions.

In the example of FIG. 4, the compliant material 308 is formed of a negative CTE (NTE), high alpha compliant material layer 402 adjacent the high conductive PCM layer 307. The compliant material layer 402 is connected to a second layer 406 via a plurality of low alpha fins or connectors 404. The second layer 406 is adjacent the abradable material layer 310. As the high alpha compliant material layer 402 is conductively heated through the high conductive material 307 (e.g., heated by the hot lube oil, etc.), the compliant material layer 402 expands radially inwards and causes the abradable layer 310 to form a tight clearance with the fan blades 132. The low alpha fins 404 move radially inward along with the NTE compliant material layer 402. Inflow of hot lube oil is controlled through the FADEC 314, for example, to actively maintain a compliant clearance between the fan case 134 and blade tips.

Figure 5:
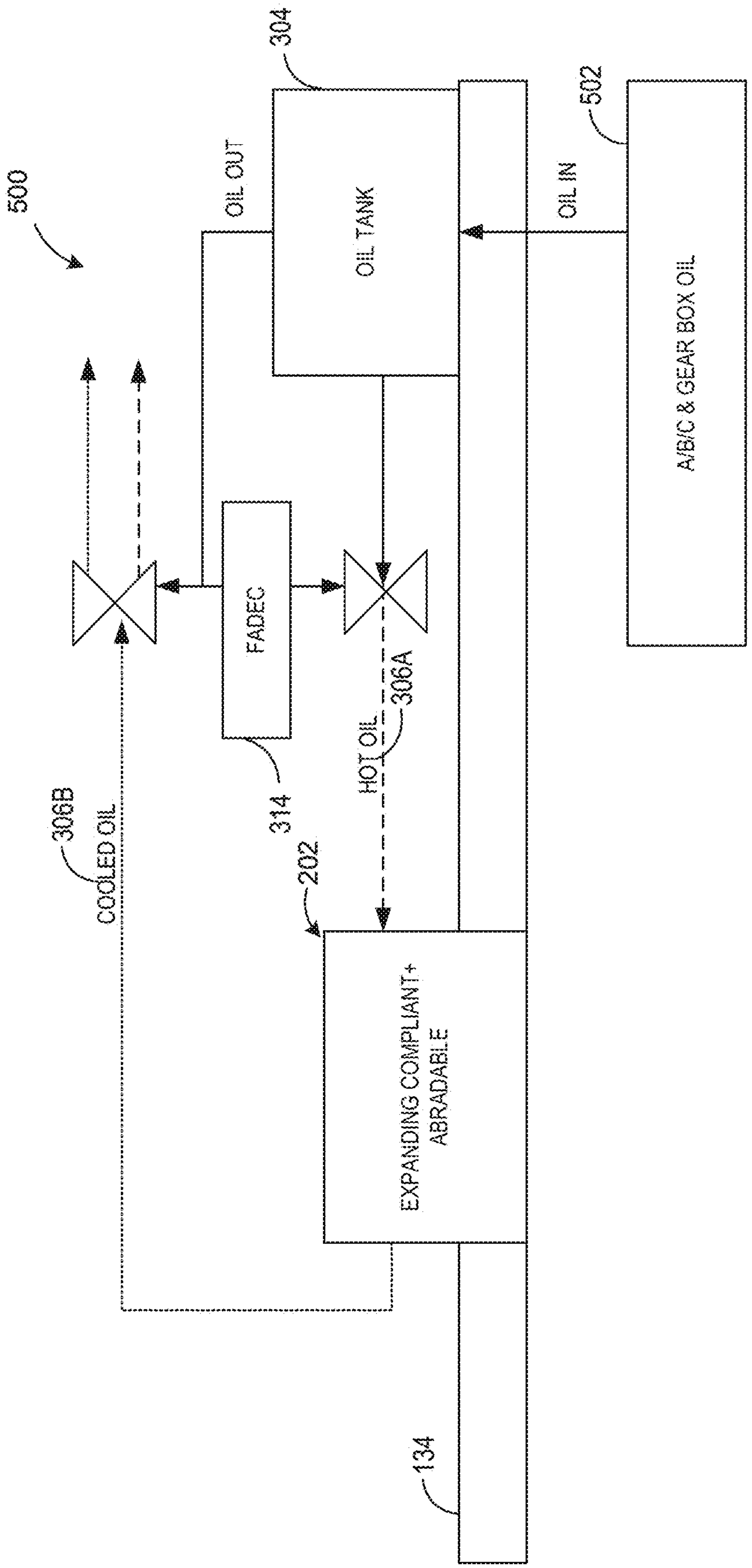
FIG. 5 illustrates an example thermal actuation framework of the thermally-actuated clearance control system of FIGS. 2 and/or 3.

FIG. 5 illustrates an example thermal actuation framework 500 of the thermally-actuated clearance control system 200 of FIGS. 2 and/or 3. The example thermal actuation framework 500 depicts a gear box oil reservoir 502, which may be located within an aircraft for use in lubrication of mechanical parts, etc. A portion of the oil from the gear box oil reservoir 502 may then be routed towards the oil tank 304 of FIG. 3 for use by the thermally-actuated clearance control system 200. Based on a determination for clearance control made by the FADEC 314, the hot lube oil 306A from the oil tank 304 is then accordingly routed towards the thermally-actuated shroud 202 and routed away from the thermally-actuated shroud 202 after actuation as cold lube oil 306B. In some examples, this cold lube oil 306B may be routed directly towards the rest of the engine (e.g., engine 316) for lubrication of mechanical parts, or it may be routed back towards the oil tank 304. In examples disclosed herein, the cold lube oil 306B stored in the oil tank 304 is reheated by ambient temperature conditions of the engine. Additionally, in examples disclosed herein, the hot lube oil 306A is characterized by a temperature greater than or equal to 400 degrees Fahrenheit, and/or the cold lube oil 306B is characterized by a temperature less than or equal to 150 degrees Fahrenheit.

Figure 6:
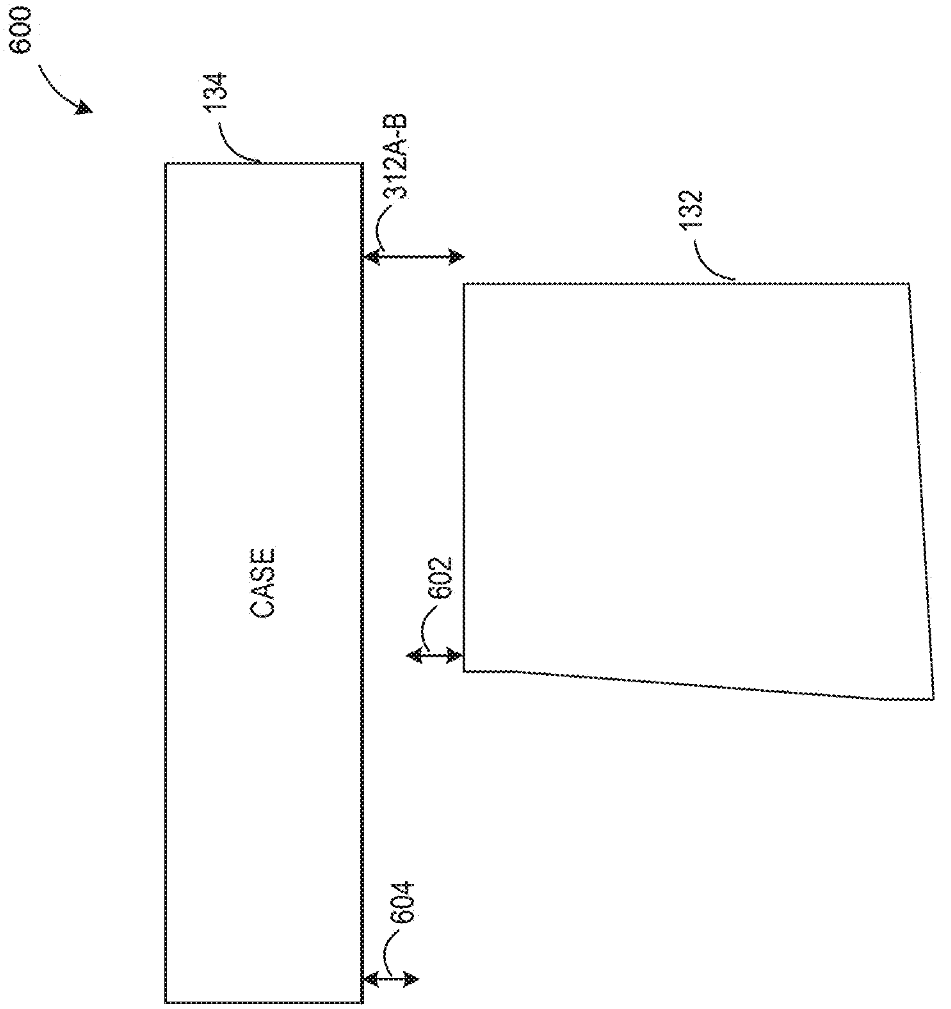
FIG. 6 illustrates an example observed radial change of an example fan blade and example shroud, contributing to a widening of a clearance width.

FIG. 6 illustrates an example set of observed radial changes 600 of the fan blade 132 and a shroud (e.g., the thermally-actuated shroud 202 of FIG. 2), contributing to a change in the clearance width (e.g., wide clearance 312A, narrow clearance 312B of FIG. 3) during all stages of aircraft use. The example blade radial change 602 represents a measure of a radial change and/or deflection of the fan blade 132 in response to ambient flight conditions, and, similarly, the example shroud radial change 604 represents a measure of radial change and/or deflection of the shroud (e.g., the thermally-actuated shroud 202 of FIG. 2) in response to ambient flight conditions.

Figure 7:
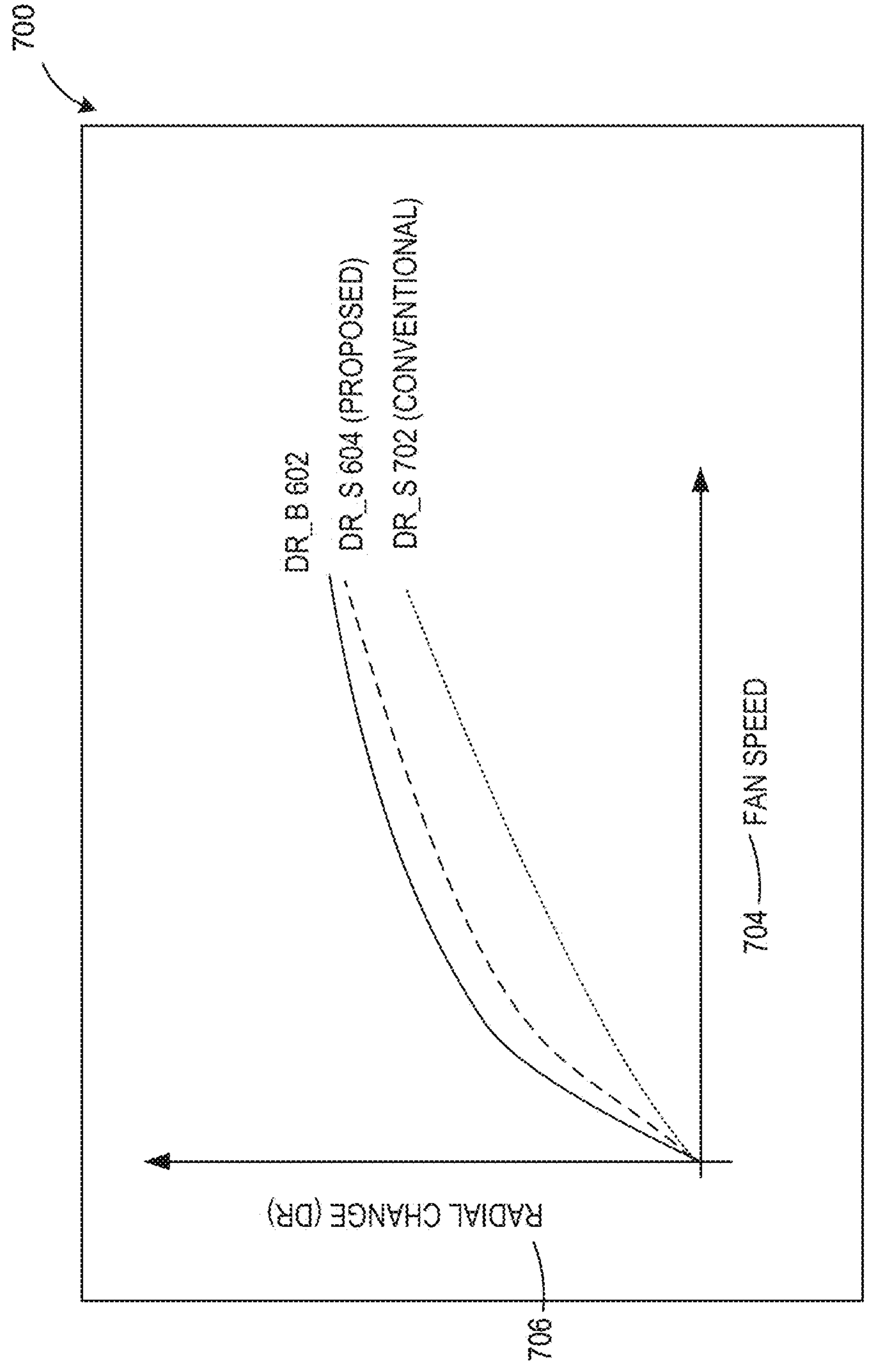
FIG. 7 depicts a radial change graph of the example fan blade and example shroud of FIG. 6.

FIG. 7 depicts an example radial change graph 700 of the example fan blade 132 and the example shroud of FIG. 6. The example radial change graph 700 provides a visualization of a radial change 706 as a fan speed 704 increases. The example blade radial change 602 is shown in relation to the shroud radial change 604 and an example conventional shroud radial change 702. In examples disclosed herein, the shroud radial change 604 represents a radial change and/or deflection of the thermally-actuated shroud 202 of the thermally-actuated clearance control system 200 of FIGS. 2 and/or 3, whereas the example conventional shroud radial change 702 represents any other type of shroud that may be utilized in known clearance control systems.

In the example radial change graph 700, the rate and/or amount of radial change 706 of the conventional shroud (e.g., the conventional shroud radial change 702) is shown to be much less than the blade radial change 602, as illustrated. This large difference in the radial change 706, as the fan speed 704 changes (e.g., increases), creates a large gap (e.g., greater than 0.4 inches, 0.6 inches, etc.) between a fan blade (e.g., the fan blade 132) and a conventional shroud of a fan casing (e.g., the fan case 134), resulting in engine performance and/or efficiency loss. On the other hand, the shroud radial change 604 is nearly identical to the blade radial change 602, indicating that the thermally-actuated shroud 202 successfully moves with the fan blade in response to changing ambient flight conditions to maintain a small clearance, resulting in higher-efficiency and higher-performance engine use.

Figure 8:
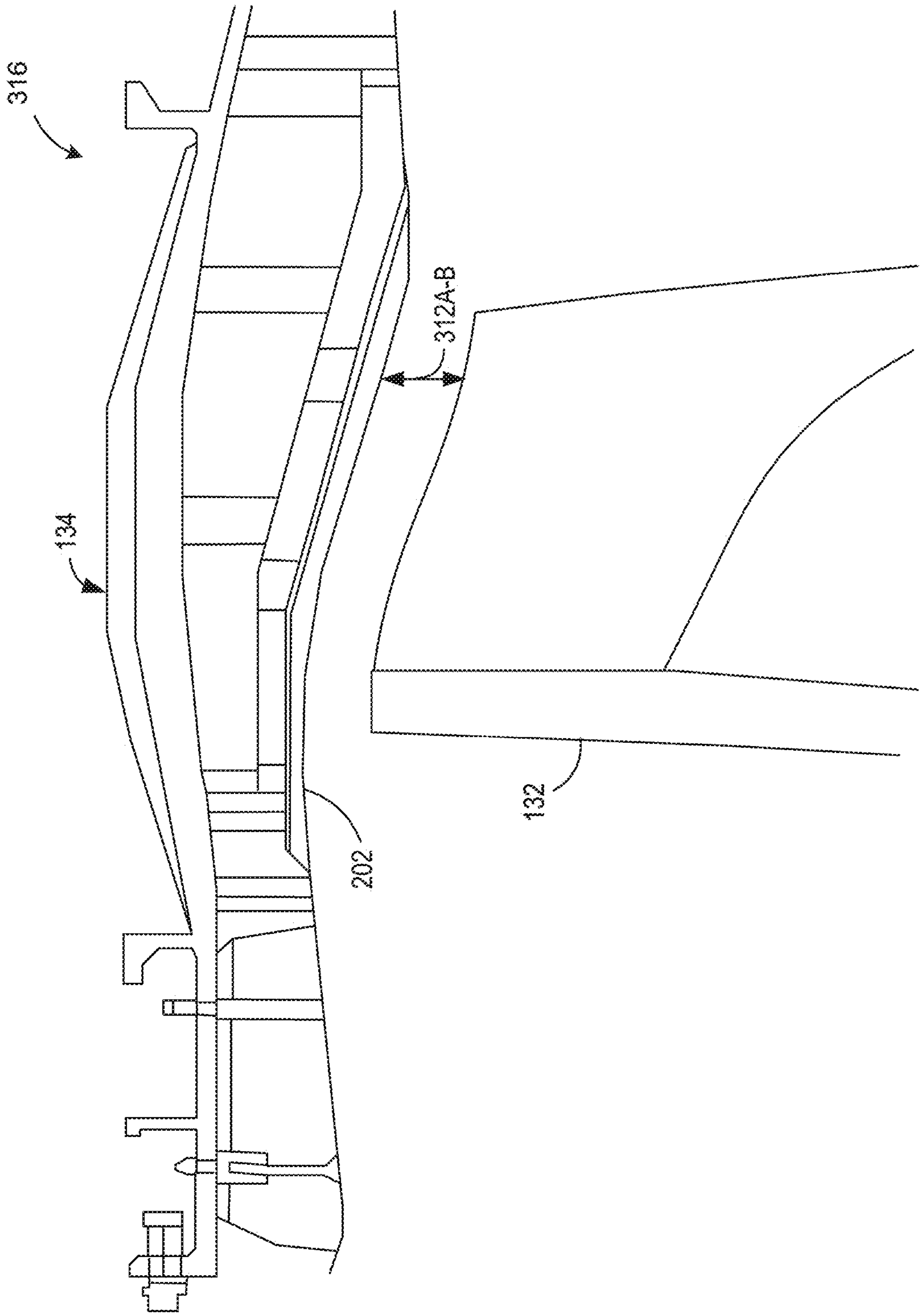
FIG. 8 further illustrates a configuration of the thermally-actuated clearance control system of FIGS. 2 and/or 3 positioned within an engine.

FIG. 8 further illustrates the thermally-actuated clearance control system 200 of FIGS. 2 and/or 3 positioned within the engine 316 of FIG. 3. The engine 316 includes the example fan blade 132 and the example fan case 134 of FIG. 1, with a clearance (e.g., the wide clearance 312A and/or the narrow clearance 312B of FIG. 3) representing the gap between the fan blade 132 and the fan case 134. In the illustrated example of FIG. 8, the fan case 134 further includes the thermally-actuated shroud 202 of FIG. 2 configured to expand and/or contract radially-inward and/or radially-outward in response to thermal actuation.

Figure 9:
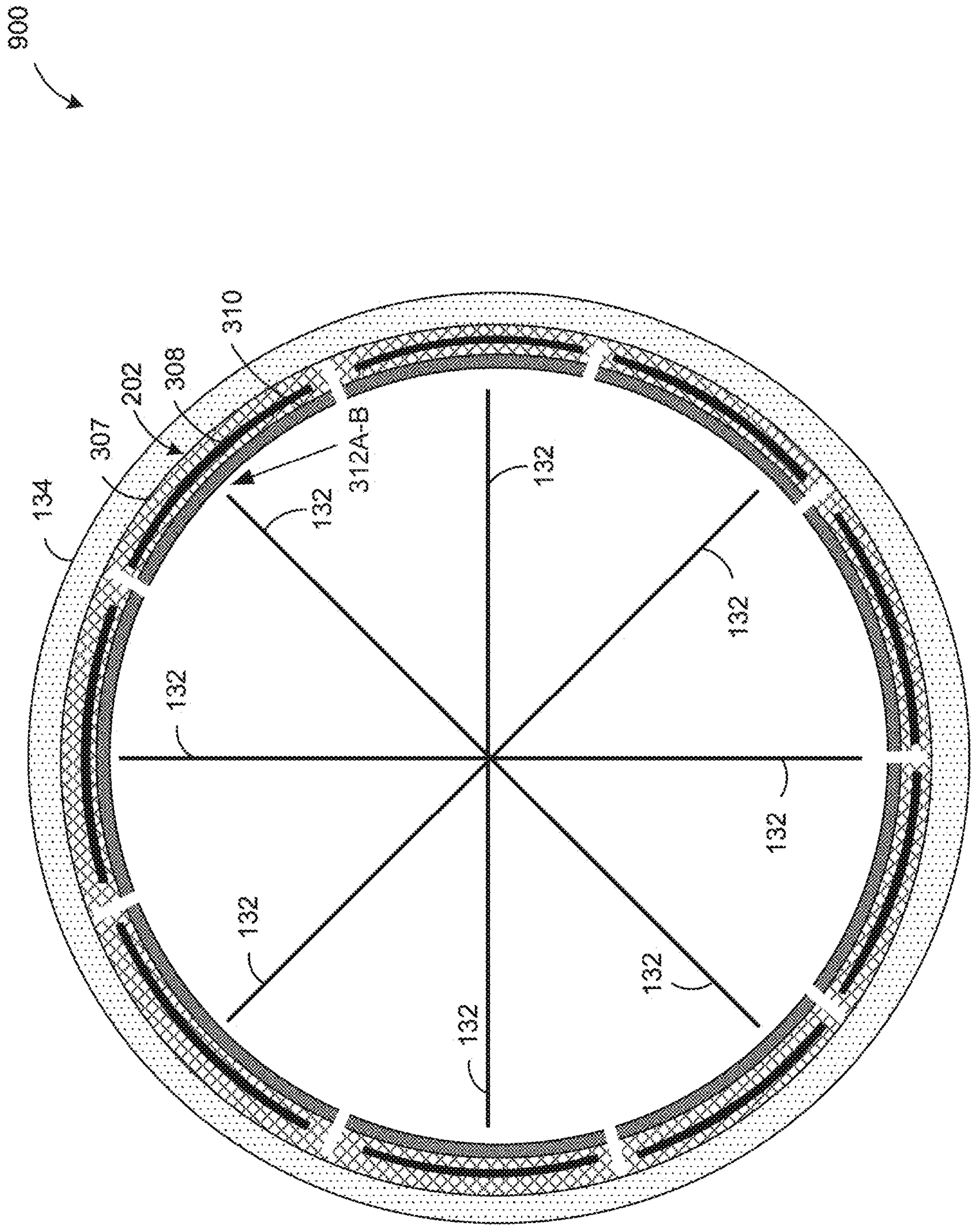
FIG. 9 shows a 360-degree view of the thermally-actuated clearance control system of FIGS. 2 and/or 3 positioned within an example rotor, in accordance with the teachings of this disclosure.

FIG. 9 illustrates an example 360-degree view of the thermally-actuated clearance control system 200 of FIGS. 2 and/or 3 positioned within an example rotor 900, in accordance with the teachings of this disclosure. In examples disclosed herein, the example thermally-actuated clearance control system 200, including the example protective material 302 and the example thermally-actuated shroud 202, including the example high conductive material 307, the example compliant material 308, and the example abradable material 310, is positioned to circumferentially enclose the example fan blades 132 approximately every 30 degrees of the rotor 900 at a clearance distance (e.g., wide clearance 312A, narrow clearance 312B of FIG. 3) from the respective fan blades 132.

Figure 10:
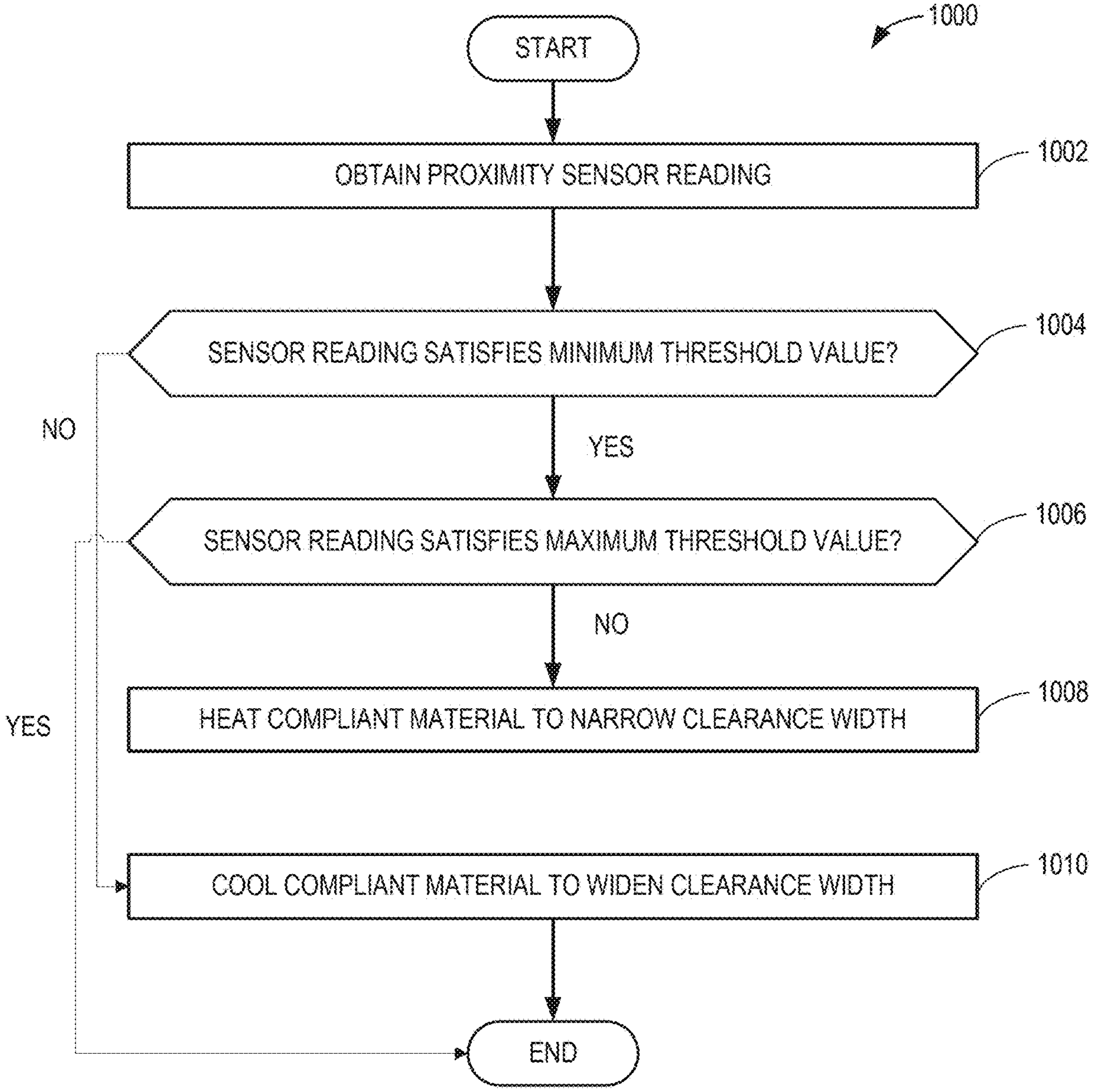
FIG. 10 is a flowchart representing machine-readable instructions to execute the example thermally-actuated clearance control system of FIGS. 2 and/or 3.

A flowchart representative of example hardware logic circuitry, machine readable instructions, hardware implemented state machines, and/or any combination thereof for implementing the example thermally-actuated clearance control system 200 of FIGS. 2 and/or 3 is shown in FIG. 10. The machine readable instructions may be one or more executable programs or portion(s) of an executable program for execution by processor circuitry, such as the processor circuitry 1112 shown in the example processor platform 1100 discussed below in connection with FIG. 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 10, many other methods of implementing the example thermally-actuated clearance control system 200 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

FIG. 10 is a flowchart representative of example machine readable instructions and/or example operations 1000 that may be executed and/or instantiated by the FADEC 314 to actively monitor widening and/or narrowing of the clearance 312A-B and provide a response to mitigate blade tip loss and/or promote high engine performance. The machine readable instructions and/or the operations 1000 of FIG. 10 begin at block 1002, at which the processor circuitry 1112 shown in the example processor platform 1100 discussed below in connection with FIG. 11 causes the proximity sensors to detect the width of the clearance.

At block 1004, as shown in FIG. 10, the processor circuitry 1112 determines whether the width of the clearance 312A-B, as measured in block 1002, satisfies a first threshold (e.g., 0.010 inches, 0.020 inches, 0.030 inches, 0.050 inches, etc.) (e.g., indicating that the clearance 312A-B has widened beyond the first threshold value, such as a maximum threshold value). In examples disclosed herein, the width of clearance 312A-B may be measured in inches, centimeters, and/or any other unit of measurement. When the clearance 312A-B is determined have satisfied the first threshold value, the process moves forward to block 1008. However, when the clearance 312A-B is determined to satisfy first threshold, the process moves to block 1006.

At block 1006, the processor circuitry 1112 establishes whether the width of the clearance 312A-B, as measured in block 1002, satisfies second threshold value (e.g., 0.005 inches, 0.006 inches, 0.007 inches, 0.008 inches, etc.) (e.g., indicating that the clearance has narrowed beyond the second threshold value, such as a minimum threshold value). In examples disclosed herein, the width of clearance 312A-B may be measured in inches, centimeters, and/or any other unit of measurement When the clearance 312A-B is determined to satisfy the second threshold, the process moves forward to the end. However, when the clearance 312A-B is determined to not satisfy the second threshold, the process moves to block 1010.

At block 1008, in response to having determined at block 1006 that the width of the clearance 312A-B is greater than a maximum acceptable threshold, the FADEC 314 causes the thermal actuation of the compliant material 308 to narrow the width of the clearance 312A-B to maintain engine performance, as further described hereinabove in conjunction with FIG. 3.

At block 1010, in response to having determined at block 1004 that the width of the clearance 312A-B is smaller than a minimum acceptable threshold, the processor circuitry 1112, in conjunction with FADEC, causes the thermal deactuation of the compliant material 308 to narrow the width of the clearance 312A-B to maintain engine performance. Similar to thermal actuation, the compliant material 308 may be cooled to cause retraction of the thermally-actuated shroud 202 of FIG. 2 to maintain an acceptable clearance width between the fan blade and fan casing.

Figure 11:
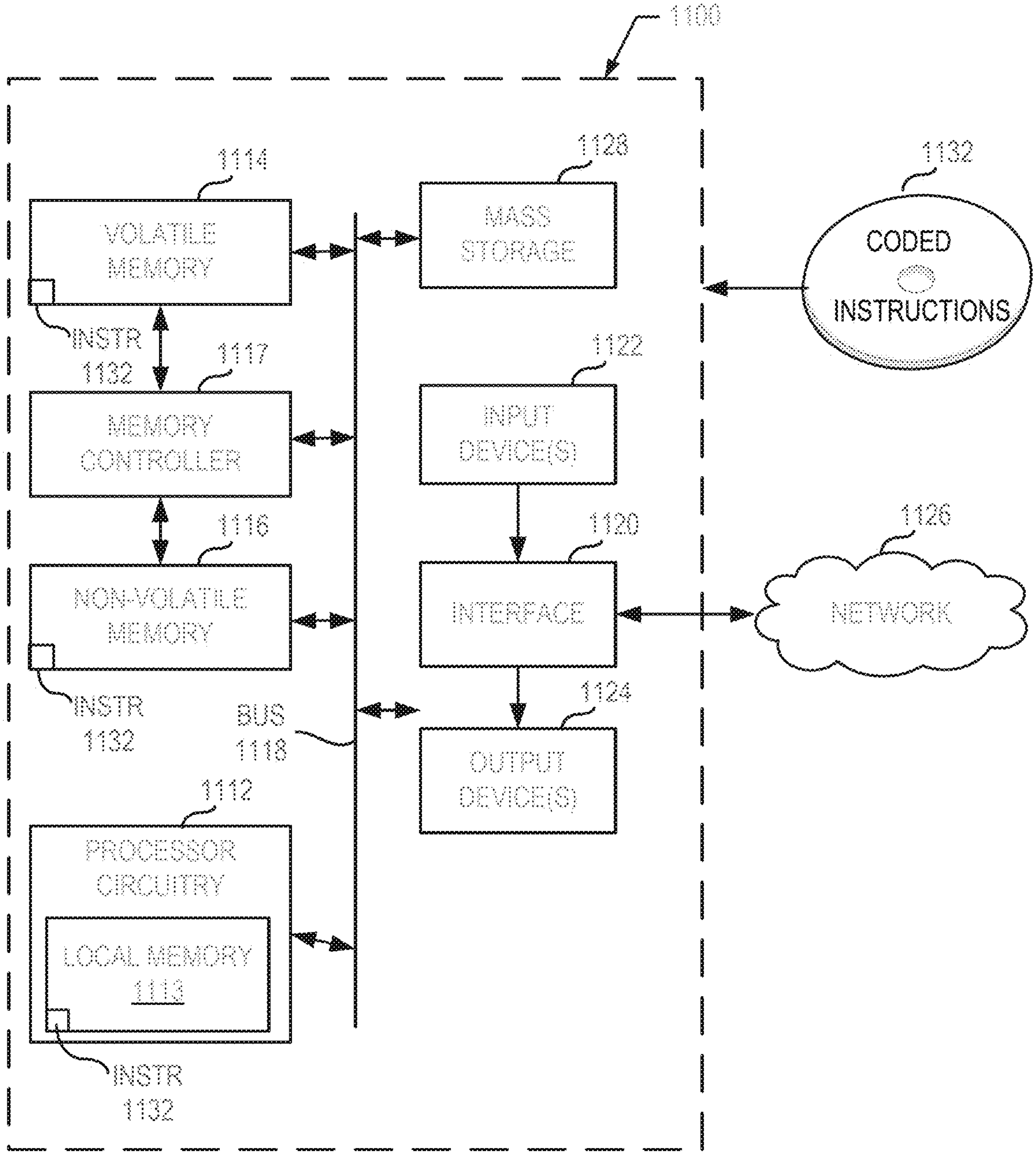
FIG. 11 is a block diagram of an example processing platform including processor circuitry structured to execute the example machine readable instructions and/or the example operations of FIG. 10 to implement the example thermally-actuated clearance control system of FIGS. 2 and/or 3.

FIG. 11 is a block diagram of an example processor platform 1100 structured to execute and/or instantiate the machine readable instructions and/or the operations of FIG. 10 to implement the example thermal actuation controller 214 of FIGS. 2 and/or 3. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs, microprocessors, CPUs, GPUs, DSPs, and/or microcontrollers from any desired family or manufacturer. The processor circuitry 1112 may be implemented by one or more semiconductor based (e.g., silicon based) devices.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1122 are connected to the interface circuitry 1120. The input device(s) 1122 permit(s) a user to enter data and/or commands into the processor circuitry 1112.

One or more output devices 1124 are also connected to the interface circuitry 1120 of the illustrated example. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 1132, which may be implemented by the machine readable instructions of FIG. 10, may be stored in the mass storage device 1128, in the volatile memory 1114, in the non-volatile memory 1116, and/or on a removable non-transitory computer readable storage medium such as a CD or DVD.

Examples disclosed herein include thermally-actuated clearance control systems. The examples disclosed herein mitigate engine performance loss by employing a dynamic clearance widening and/or narrowing response to blade tip expansion and/or retraction during changing flight conditions. Examples disclosed can reduce the cost of continual replacement of rotor blades of gas turbine engines by reducing significant contact between the rotor blades and fan casing, as well as significantly improve engine performance by preventing and/or otherwise mitigating heat and/or energy loss during operation of the engine. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Further aspects of the present disclosure are provided by the subject matter of the following clauses:

Example 1 includes a thermally-actuated clearance control system for a gas turbine engine including: a compliant material; a high-conductive material coupled to a first surface of the compliant material, the high-conductive material thermally coupling the compliant material to a heated substance, the compliant material to expand radially-inward toward a fan blade when the high-conductive material provides heat; and an abradable material coupled to a second surface of the compliant material facing the fan blade.

Example 2 includes the thermally-actuated clearance control system of any preceding clause, wherein the compliant material is characterized by a negative coefficient of thermal expansion.

Example 3 includes the thermally-actuated clearance control system of any preceding clause, wherein the negative coefficient of thermal expansion indicates a low sensitivity of the compliant material to ambient temperature.

Example 4 includes the thermally-actuated clearance control system of any preceding clause, wherein the high-conductive material provides a barrier to the compliant material against the heated substance.

Example 5 includes the thermally-actuated clearance control system of any preceding clause, wherein the heated substance is hot air.

Example 6 includes the thermally-actuated clearance control system of any preceding clause, wherein the heated substance is hot lube oil.

Example 7 includes the thermally-actuated clearance control system of any preceding clause, wherein the hot lube oil, after heating the high-conductive material becomes cold lube oil.

Example 8 includes the thermally-actuated clearance control system of any preceding clause, further including a controller to heat the heated substance in response to a measured clearance not satisfying a threshold value.

Example 9 includes the thermally-actuated clearance control system of any preceding clause, further including a proximity sensor to measure the clearance.

Example 10 includes the thermally-actuated clearance control system of any preceding clause, wherein the controller is to stop heating the heated substance in response to a second measured clearance satisfying a threshold value.

Example 11 includes a gas turbine including a compressor including a compressor casing and a plurality of compressor blades, a turbine, comprising a turbine casing and a plurality of turbine blades, a shaft rotatably coupling the compressor and the turbine, and a thermally-actuated clearance control system for at least one of the compressor or the turbine, the system including: a compliant material; a high-conductive material coupled to a first surface of the compliant material, the high-conductive material thermally coupling the compliant material to a heated substance, the compliant material to expand radially-inward toward a fan blade when the high-conductive material provides heat; and an abradable material coupled to a second surface of the compliant material facing the fan blade.

Example 12 includes the gas turbine of any preceding clause, wherein the compliant material is characterized by a negative coefficient of thermal expansion.

Example 13 includes the gas turbine of any preceding clause, wherein the negative coefficient of thermal expansion indicates a low sensitivity of the compliant material to ambient temperature.

Example 14 includes the gas turbine of any preceding clause, wherein the high-conductive material provides a barrier to the compliant material against the heated substance.

Example 15 includes the gas turbine of any preceding clause, wherein the heated substance is hot air.

Example 16 includes the gas turbine of any preceding clause, wherein the heated substance is hot lube oil.

Example 17 includes the gas turbine of any preceding clause, wherein the compliant material is a high alpha material connected to fins of a low material.

Example 18 includes the gas turbine of any preceding clause, further including a controller, the controller to heat the heated substance in response to a measured clearance not satisfying a threshold value.

Example 19 includes the gas turbine of any preceding clause, further including a proximity sensor to measure the measured clearance.

Example 20 includes the gas turbine of any preceding clause, wherein the controller is to stop heating the heated substance in response to a second measured clearance satisfying the threshold value.

Example 21 includes the thermally-actuated clearance control system of any preceding clause, wherein the compliant material is a high alpha material connected to fins of a low material.

Example 22 includes a processor and a memory, the processor to at least: obtain a proximity sensor reading; determine whether the sensor reading satisfies a minimum threshold value; when the sensor reading does not satisfy the minimum threshold value, cool a compliant material to widen a clearance width; when the sensor reading satisfies the minimum threshold value, determine whether the sensor reading satisfies a maximum threshold value; when the sensor reading satisfies the maximum threshold value, cool the compliant material to width the clearance width; and, when the sensor reading does not satisfy the maximum threshold value, heat the compliant material to narrow the clearance width.

Example 23 includes a method including: obtaining a proximity sensor reading; determining whether the sensor reading satisfies a minimum threshold value; when the sensor reading does not satisfy the minimum threshold value, cooling a compliant material to widen a clearance width; when the sensor reading satisfies the minimum threshold value, determining whether the sensor reading satisfies a maximum threshold value; when the sensor reading satisfies the maximum threshold value, cooling the compliant material to width the clearance width; and, when the sensor reading does not satisfy the maximum threshold value, heating the compliant material to narrow the clearance width.

The following claims are hereby incorporated into this Detailed Description by this reference, with each claim standing on its own as a separate embodiment of the present disclosure.

What is claimed is:

1. A thermally-actuated clearance control system for a gas turbine engine, the thermally-actuated clearance control system comprising:
- a thermally-actuated shroud;
- a sensor to measure a clearance between the thermally-actuated shroud and a fan blade; and
- a controller to at least:
  - heat the thermally-actuated shroud in response to the measured clearance being more than a threshold; and
  - cool the thermally-actuated shroud in response to the measured clearance being less than the threshold,
- wherein the thermally-actuated shroud is positioned with respect to a protective material, the protective material including a compliant material, an abradable material, and a high-conductive material, the high-conductive material thermally coupling the compliant material to a heated substance, the high-conductive material providing a barrier to the compliant material against the heated substance.

2. The thermally-actuated clearance control system of claim 1, wherein the
- high-conductive material is coupled to a first surface of the compliant material, the first surface facing a casing, the compliant material to expand radially-inward toward the fan blade when the high-conductive material provides heat; and wherein the
- abradable material is coupled to a second surface of the compliant material facing the fan blade.

3. The thermally-actuated clearance control system of claim 1, wherein the thermally-actuated shroud is positioned inside a fan case.

4. The thermally-actuated clearance control system of claim 1, wherein the controller is a thermal actuation controller in communication with a Full Authority Digital Engine Control.

5. The thermally-actuated clearance control system of claim 1, wherein the controller is to heat the thermally-actuated shroud with a flow of hot lube oil and cool the thermally-actuated shroud with a flow of cold lube oil.

6. The thermally-actuated clearance control system of claim 1, wherein the controller is to heat the thermally-actuated shroud with a flow of hot air and cool the thermally-actuated shroud with a flow of cool air.

7. The thermally-actuated clearance control system of claim 1, wherein the thermally-actuated shroud is to move radially inward when heated and radially outward when cooled.

8. The thermally-actuated clearance control system of claim 1, wherein the measured clearance is measured at a first time, and wherein the controller is to stop heating in response to the measured clearance, when measured at a second time, satisfying the threshold.

9. A gas turbine comprising:
- a compressor including a compressor casing and a plurality of compressor blades;
- a turbine, comprising a turbine casing and a plurality of turbine blades;
- a shaft rotatably coupling the compressor and the turbine; and
- a thermally-actuated clearance control system comprising:
  - a shroud;
  - a sensor to measure a clearance between the shroud and a fan blade; and
  - a controller to at least:
    - heat the shroud in response to the measured clearance being more than a threshold; and
  - cool the shroud in response to the measured clearance being less than the threshold,
  - wherein the shroud is positioned with respect to a protective material the protective material including a compliant material, an abradable material, and a high-conductive material, the high-conductive material thermally coupling the compliant material to a heated substance, the high-conductive material providing a barrier to the compliant material against the heated substance.

10. The gas turbine of claim 9, wherein the
- high-conductive material is coupled to a first surface of the compliant material, the first surface facing a casing, the compliant material to expand radially-inward toward the fan blade when the high-conductive material provides heat; and wherein the
- abradable material is coupled to a second surface of the compliant material facing the fan blade.

11. The gas turbine of claim 9, further including a fan case, wherein the shroud is positioned inside the fan case.

12. The gas turbine of claim 9, wherein the controller is a thermal actuation controller in communication with a Full Authority Digital Engine Control.

13. The gas turbine of claim 9, wherein the controller is to heat the shroud with a flow of hot lube oil and cool the shroud with a flow of cold lube oil.

14. The gas turbine of claim 9, wherein the controller is to heat the shroud with a flow of hot air and cool the shroud with a flow of cool air.

15. The gas turbine of claim 9, wherein the measured clearance is measured at a first time, and wherein the controller is to stop heating in response to the measured clearance, when measured at a second time, satisfying the threshold.

* * * * *